United States Patent
Lovlekar et al.

(10) Patent No.: US 12,057,927 B2
(45) Date of Patent: Aug. 6, 2024

(54) CELL SEARCH FOR NEW RADIO

(71) Applicant: Apple Inc., Cupertino, CA (US)

(72) Inventors: Srirang A. Lovlekar, Fremont, CA (US); Sree Ram Kodali, San Jose, CA (US); Sethuraman Gurumoorthy, San Ramon, CA (US); Lakshmi N. Kavuri, San Jose, CA (US); Murtaza A. Shikari, Mountain View, CA (US); Shashikant Tiwari, Fremont, CA (US); Sridhar Prakasam, Fremont, CA (US); Vijay Gadde, San Jose, CA (US); Vijay Venkataraman, San Jose, CA (US); Xiangpeng Jing, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/948,418

(22) Filed: Sep. 17, 2020

(65) Prior Publication Data

US 2022/0085906 A1    Mar. 17, 2022

(51) Int. Cl.
| | |
|---|---|
| *H04J 11/00* | (2006.01) |
| *H04L 5/00* | (2006.01) |
| *H04L 27/26* | (2006.01) |
| *H04W 56/00* | (2009.01) |
| *H04W 76/27* | (2018.01) |

(52) U.S. Cl.
CPC ........ *H04J 11/0073* (2013.01); *H04L 5/0092* (2013.01); *H04L 27/2657* (2013.01); *H04W 56/003* (2013.01); *H04W 76/27* (2018.02); *H04J 2011/0096* (2013.01)

(58) Field of Classification Search
CPC ...... H04J 11/0073; H04J 76/27; H04J 5/0092; H04J 27/2657; H04J 56/003; H04J 2011/0096

See application file for complete search history.

(56) References Cited

U.S. PATENT DOCUMENTS

| | | | |
|---|---|---|---|
| 2009/0088154 A1* | 4/2009 | Umatt | H04W 48/16 455/434 |
| 2014/0370914 A1* | 12/2014 | Jung | H04W 4/02 455/456.1 |
| 2015/0296391 A1* | 10/2015 | Kotkar | H04W 84/045 370/254 |
| 2019/0158345 A1* | 5/2019 | Lincoln | H04J 11/0056 |
| 2019/0306915 A1* | 10/2019 | Jin | H04W 76/28 |
| 2020/0092738 A1* | 3/2020 | Ahlstrom | H04W 8/22 |
| 2020/0374727 A1* | 11/2020 | Da Silva | H04W 72/0453 |
| 2021/0022019 A1* | 1/2021 | Zha | H04L 27/26025 |
| 2021/0337487 A1* | 10/2021 | Park | H04L 27/2613 |
| 2022/0150807 A1* | 5/2022 | Nishant | H04W 48/14 |

\* cited by examiner

*Primary Examiner* — Joseph A Bednash
(74) *Attorney, Agent, or Firm* — Fay Kaplun & Marcin, LLP

(57) ABSTRACT

The exemplary embodiments describe devices, systems and methods for implementing various exemplary techniques related to fifth generation (5G) new radio (NR) cell search. A user equipment (UE) selects a frequency band to scan during a cell search procedure and identifies a frequency within the frequency band that is associated with a synchronization signal block (SSB) based on an indication of the frequency stored locally at the UE prior to the cell search procedure. The UE then scans the frequency for the SSB and determines that the SSB has been broadcast by a cell over the frequency.

17 Claims, 6 Drawing Sheets

CELL SEARCH FOR NEW RADIO

BACKGROUND

A user equipment (UE) may perform a cell search to identify a cell that is available for camping. For example, the UE may scan one or more frequency bands and monitor for synchronization information broadcast by a cell of the network. Once detected, the UE may acquire time and frequency synchronization with the cell using the synchronization information. The cell search procedure may precede the establishment of a connection between the UE and the cell. Therefore, the duration of the cell search procedure has a direct impact on the amount of time it takes the UE to access network services via the cell. Consequently, a slow cell search procedure may have a negative impact on the user experience at the UE.

SUMMARY

Some exemplary embodiments are related to a method performed at a user equipment (UE). The UE selects a frequency band to scan during a cell search procedure and identifies a frequency within the frequency band that is associated with a synchronization signal block (SSB) based on an indication of the frequency stored locally at the UE prior to the cell search procedure. The UE then scans the frequency for the SSB and determines that the SSB has been broadcast by a cell over the frequency.

Other exemplary embodiments are related to a user equipment (UE) having a transceiver configured to communicate with a network and a processor configured to perform operations. The operations include selecting a frequency band to scan during a cell search procedure, identifying a frequency within the frequency band that is associated with a synchronization signal block (SSB) based on an indication of the frequency stored locally at the UE prior to the cell search procedure, scanning the frequency for the SSB and determining that the SSB has been broadcast by a cell over the frequency.

Still further exemplary embodiments are related to a baseband processor configured to perform operations. The operations including selecting a frequency band to scan during a cell search procedure, identifying a frequency within the frequency band that is associated with a synchronization signal block (SSB) based on an indication of the frequency stored locally at a user equipment (UE) prior to the cell search procedure, scanning the frequency for the SSB and determining that the SSB has been broadcast by a cell over the frequency.

DETAILED DESCRIPTION

Figure 1:
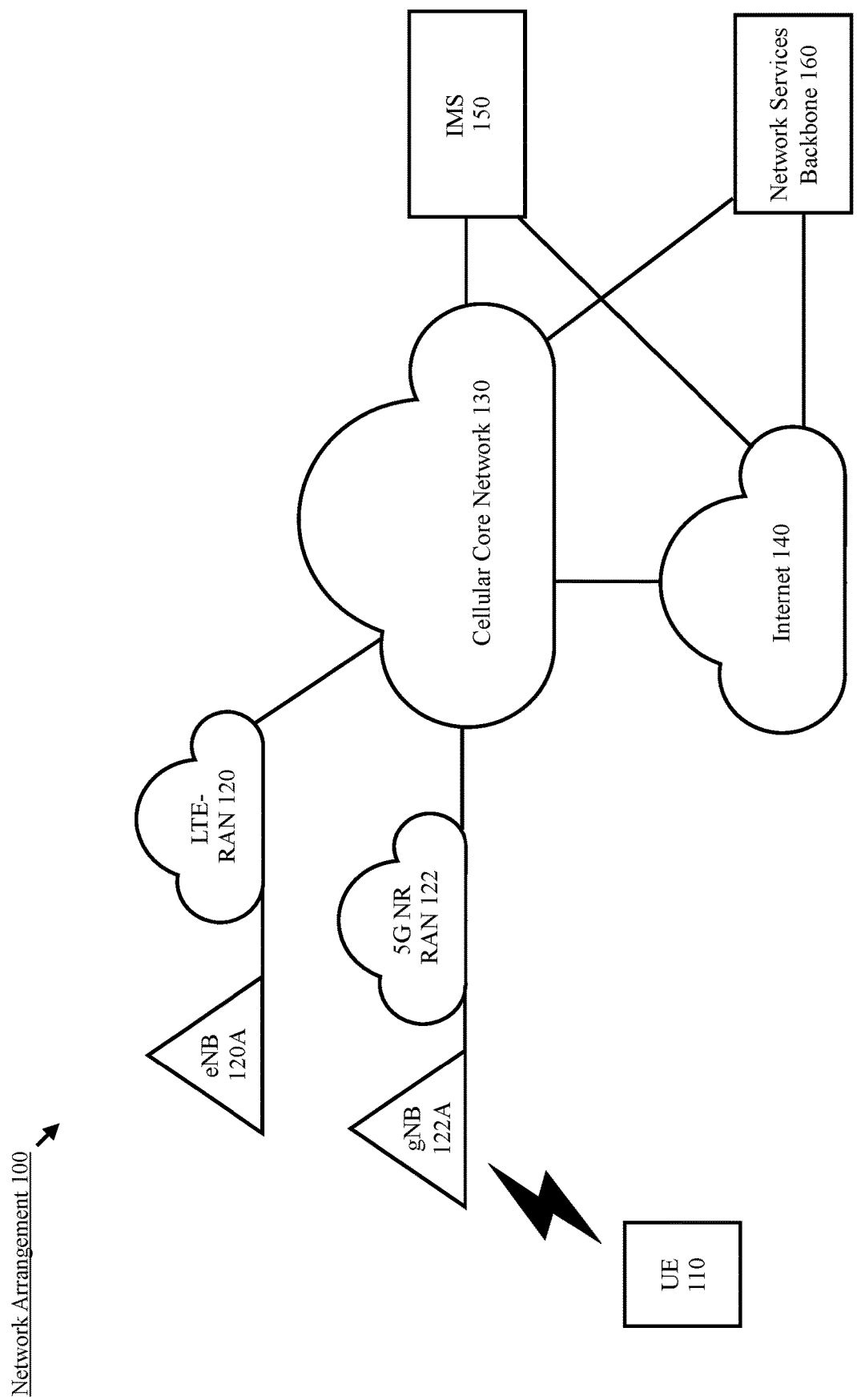
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for implementing various exemplary techniques related to fifth generation (5G) new radio (NR) cell search.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may perform a cell search to identify a cell that is available for camping. Those skilled in the art will understand that the term "cell search" generally refers to a procedure during which the UE scans one or more frequency bands in an attempt to synchronize with a cell of the network. For example, the UE may tune its transceiver to a particular frequency and monitor for synchronization information broadcast by a cell of the network. Once detected, the UE may acquire time and frequency synchronization with the cell using the synchronization information. However, reference to the term "cell search" is merely provided for illustrative purposes. Different entities may refer to a similar concept by a different name.

The cell search procedure may precede the establishment of the network connection. Thus, the duration of the cell search procedure accounts for at least a portion of the amount of time it takes the UE to access network services via the corresponding cell. A slow cell search procedure may delay access to network services and have a negative impact on the user experience.

Various aspects of 5G NR have been identified as a potential source of latency for the cell search procedure. To provide an example, compared to Long Term Evolution (LTE) and legacy networks, 5G NR bands are wider and it may take a longer time to scan all of the available 5G NR frequency bands. To provide another example, some 5G NR bands support multiple types of subcarrier spacing (SCS). Under conventional circumstances, the UE may scan the same 5G NR frequency band multiple times to account for the different types of SCS. These examples demonstrate that in some 5G NR scenarios there is a lot of spectrum available for scanning during a cell search procedure.

The exemplary embodiments include various techniques related to scanning for and/or synchronizing with a 5G NR cell. These exemplary techniques may be used to reduce the amount of time it takes for the UE to acquire 5G NR coverage via a cell search procedure. Further, the exemplary techniques may decrease the number of operations performed by the UE during the cell search procedure and thus may also provide a power saving benefit. These exemplary techniques may be used in conjunction with other currently implemented cell search techniques, future implementations of cell search techniques or independently from other cell search techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are an LTE radio access network (LTE-RAN) 120 and a 5G New Radio (NR) radio access network (5G NR-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 122 and/or the LTE-RAN 120. Therefore, the UE 110 may have both an LTE chipset to communicate with the LTE-RAN 120 and a 5G NR chipset to communication with the 5G NR-RAN 122.

The LTE-RAN 120 and the 5G NR-RAN 122 may be portions of cellular networks that may be deployed by cellular providers (e.g., Verizon, AT&T, T-Mobile, etc.). These networks 120 and 122 may include, for example, cells or base stations (Node Bs, eNodeBs, HeNBs, eNBS, gNBs, gNodeBs, macrocells, microcells, small cells, femtocells, hot spots, etc.) that are configured to send and receive traffic from UEs that are equipped with the appropriate cellular chip set.

The use of a separate LTE-RAN 120 and a 5G NR-RAN 122 is merely provided for illustrative purposes. An actual network arrangement may include a radio access network that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve dual connectivity by establishing a connection to at least one cell corresponding to the LTE-RAN 120 and at least one cell corresponding to the 5G NR-RAN 122. In another exemplary configuration, the UE 110 may achieve ENDC by establishing a connection to at least two cells corresponding to the NG-RAN or other type of similar RAN. Accordingly, the example of a separate LTE-RAN 120 and a 5G NR-RAN 122 is merely provided for illustrative purposes.

Returning to the exemplary network arrangement 100, the UE 110 may connect to the LTE-RAN 120 via the evolved Node B (eNB) 120A. The UE 110 may connect to the 5G NR-RAN 122 via the next generation Node B (gNB) 122A. Those skilled in the art will understand that any association procedure may be performed for the UE 110 to connect to the LTE-RAN 120 or the 5G NR-RAN 122. For example, as discussed above, the 5G NR-RAN 122 may be associated with a particular cellular provider where the UE 110 and/or the user thereof has a contract and credential information (e.g., stored on a SIM card). Upon detecting the presence of the 5G NR-RAN 122 via a cell search procedure, the UE 110 may transmit the corresponding credential information to associate with the 5G NR-RAN 122. More specifically, the UE 110 may associate with a specific cell (e.g., the gNB 122A of the 5g NR-RAN 122). Similarly, for access to LTE services, the UE 110 may associate with eNB 120A.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
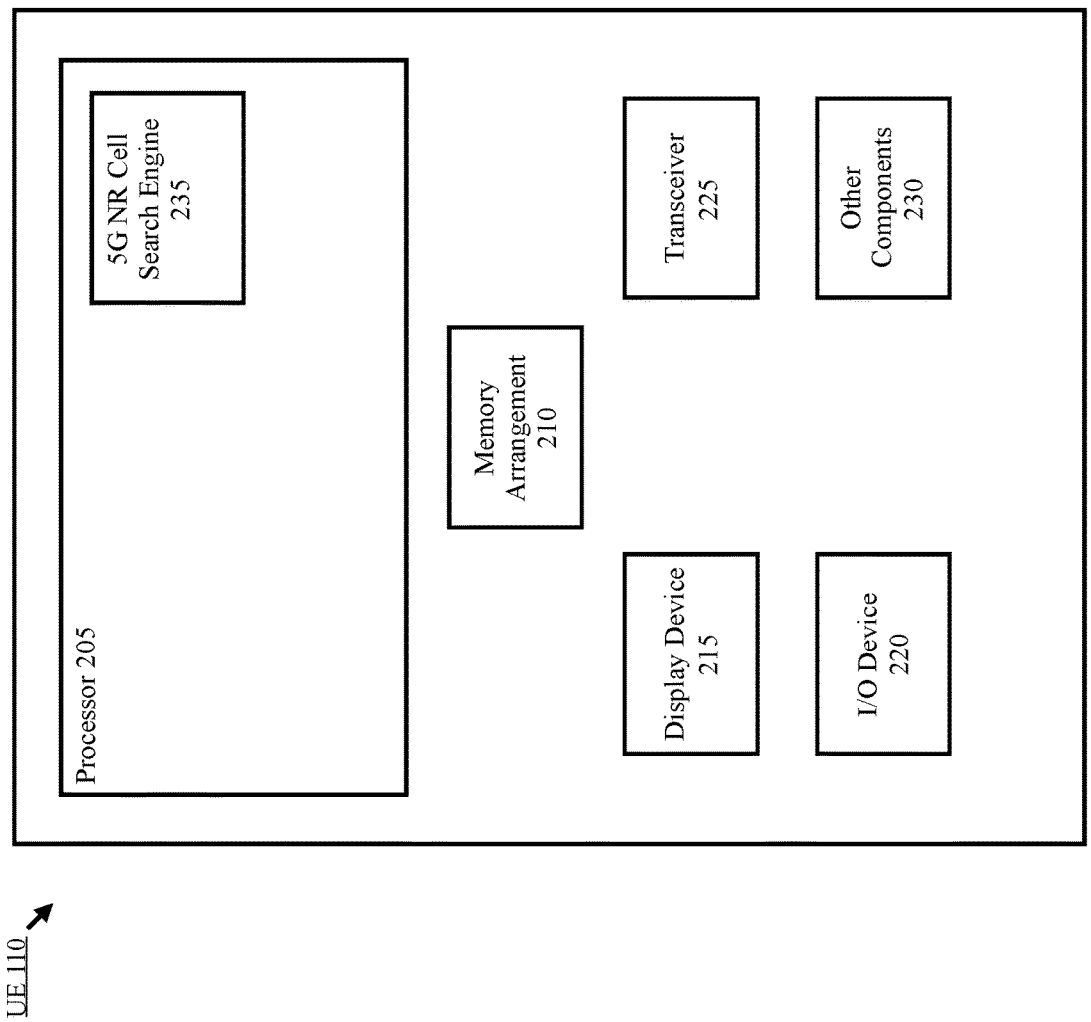
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a 5G NR cell search engine 235. The 5G NR cell search engine 235 may perform various operations related to performing a cell search for a 5G NR cell.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

As mentioned above, a cell search procedure generally refers to a process during which the UE 110 scans one or more frequency bands in an attempt to identify a cell that is available for camping. To provide an example, the UE 110 may tune its transceiver 225 to a particular frequency band. The UE 110 may then monitor for synchronization information broadcast by a cell over the frequency band. If the UE 110 does not detect any synchronization information on the currently tuned frequency, the UE 110 may then tune its transceiver 225 to a different frequency and once again monitor for synchronization information. Once detected, the UE 110 may acquire time and frequency synchronization with the cell using the synchronization information. The above example is not intended to limit the exemplary embodiments in any way. Instead, the above example is merely provided to illustrate a general example of the type of operations that may be performed during a cell search procedure. Specific examples of cell search procedures that incorporate the exemplary techniques described herein will be described in more detail below.

The exemplary embodiments include various techniques related to scanning for and/or synchronizing with a 5G NR cell (e.g., gNB 122A). These exemplary techniques will be described with regard to a cell search procedure that includes a synchronization signal block (SSB). Those skilled in the art will understand that each SSB may include content such as, but not limited to, a cell ID, a primary synchronization signal (PSS), a secondary synchronization signal (SSS), physical broadcast channel (PBCH) data, master information block (MIB), etc. However, any reference to an SSB or a particular SSB configuration is merely provided for illustrative purposes. The exemplary embodiments may utilize any appropriate type of synchronization information.

To synchronize with a 5G NR cell (e.g., gNB 122A), cell timing may be acquired by the UE 110 from an SSB. For example, the 5G NR cell may broadcast SSB periodically every x milliseconds (ms) over a particular frequency band using any appropriate SCS (e.g., 15 kilohertz (Khz), 30 Khz, 120 Khz, 240 Khz, etc.). When tuned to this frequency band, the UE 110 may detect and decode the contents of the SSB to synchronize with the 5G NR cell. Since the cell search procedure precedes the establishment of the radio link between the UE 110 and the cell, the duration of the cell search procedure accounts for at least a portion of the amount of time it takes for the UE 110 to receive network services via the 5G NR cell. As will be described in detail below, the exemplary embodiments include various exemplary techniques related to the UE 110 scanning for SSBs. These exemplary techniques may be used to limit a duration of the cell search.

Some exemplary techniques may be described with regard to a channel raster and/or a synchronization raster. Those skilled in the art will understand that a channel raster may define a set of reference frequencies used to identify the position of radio frequency (RF) channels, SSBs and other elements. For 5G NR, each reference frequency of the channel raster may be uniquely identified by an NR absolute radio frequency channel number (NR-ARFCN).

The cell may transmit an SSB at certain frequency positions defined by the synchronization raster. For 5G NR, each reference frequency of the synchronization raster may be uniquely identified by a global synchronization channel number (GSCN). Thus, a GSCN may indicate the frequency position of an SSB. However, any reference to a channel raster, NR-ARFCN, a synchronization raster or GSCN is merely provided for illustrative purposes. Different entities may refer to similar concepts by different names.

One aspect of 5G NR that has been identified as a potential source of latency for the cell search procedure is the configuration of the 5G NR spectrum. For example, compared to LTE and legacy networks, 5G NR frequency bands are wider. Therefore, it may take the UE 110 a relatively long time to scan a portion of the NR-ARFCNs of the channel raster. To avoid this issue, some exemplary embodiments may perform a scan using a synchronization raster that is configured to have less GSCN compared to the NR-ARFCNs of the channel raster. By implementing a sparser synchronization raster, the duration of the cell search may be kept to a minimum.

Figure 3:
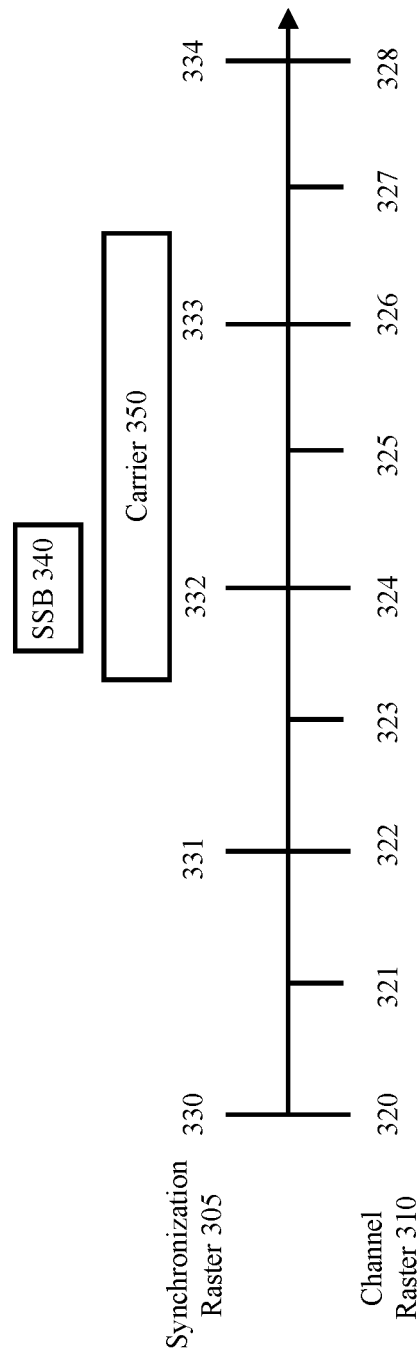
FIG. 3 illustrates an example of a synchronization raster and a channel raster.

FIG. 3 illustrates an example of a synchronization raster 305 and a channel raster 310. The channel raster 310 shows eight NR-ARFCNs 320-328 and the synchronization raster shows four GSCNs 330-334. Thus, the synchronization raster 305 is configured to have less GSCNs compared to the NR-ARFCNs of the channel raster 310. In this example, an SSB 340 is also shown as being broadcast at GSCN 332 within a carrier 350 that spans between approximately NR-ARFCNs 323-327.

In 5G NR, the SSB is not limited to the central bandwidth of the carrier. Instead, the SSB may be located anywhere within the supported bandwidth. An example of this 5G NR feature is shown by SSB 340 and carrier 350 of FIG. 3.

One exemplary technique relates to performing a targeted scan during the cell search procedure using information collected during a previous cell search procedure or from any other appropriate source. In one example, this type of information may be stored locally at the UE 110 in a database. Throughout this description, this database may be referred to as an acquisition database.

To scan a 5G NR frequency band, the UE 110 may split the band into multiple sub-bands. The UE 110 may then capture samples from each sub-band and process the samples to determine whether an SSB is present at a particular sub-band. However, the acquisition database may already include information about SSB locations (e.g., GSCN) within the particular frequency band. Thus, during a scan of a frequency band, the UE 110 may target sub-bands that are likely to be used for SSB and/or skip sub-bands that were previously determined not to be used for SSB.

Figure 4:
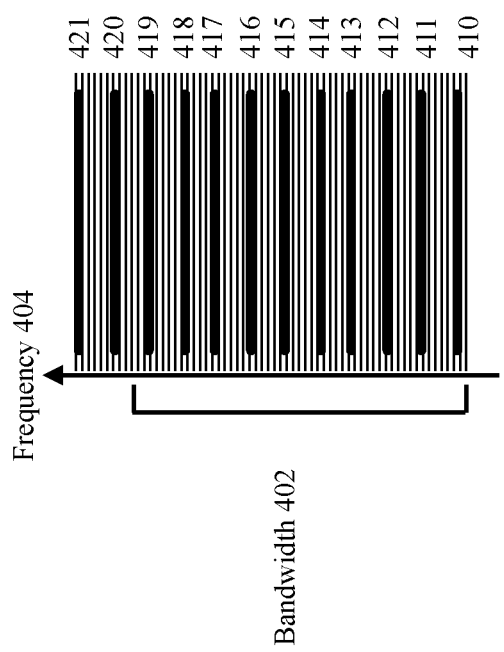
FIG. 4 illustrates an example of a bandwidth with known SSB locations.

FIG. 4 illustrates an example of a bandwidth 402 with known SSB locations. In this example, the twelve GSCNs 410-421 of the synchronization raster are shown on the frequency spectrum 404. Here, assume the acquisition database indicates that GSCNs 411, 420 and 421 are likely to include SSB. Thus, in some embodiments, the UE 110 may perform a scan that targets GSCNs 411, 420, 421 and omits GSCNs 410, 412-419.

A general overview of a cell search procedure that incorporates this exemplary technique will be described below with regard to the method 500 of FIG. 5. A more detailed description of maintaining the acquisition database will be described below with regard to the method 600 of FIG. 6.

Figure 5:
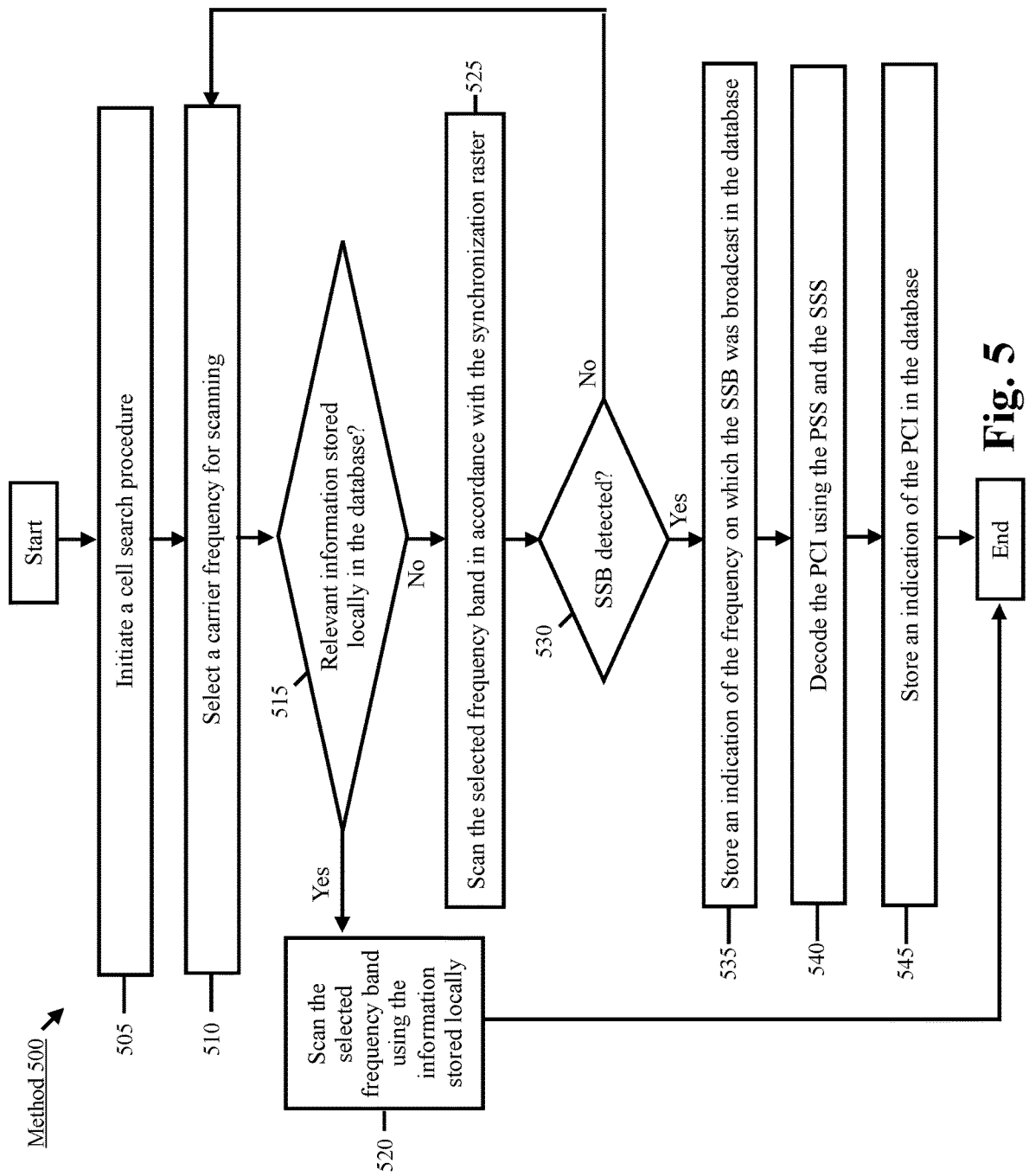
FIG. 5 shows a method for a cell search procedure according to various exemplary embodiments.

FIG. 5 shows a method 500 for a cell search procedure according to various exemplary embodiments. The method 500 will be described with regard to the network arrangement 100 of FIG. 1 and the UE 110 of FIG. 2.

In 505, the UE 110 initiates a cell search procedure. The cell search procedure may be triggered based on any of a variety of different conditions. However, the reason for initiating the cell search procedure is beyond the scope of the exemplary embodiments. The exemplary embodiments may apply to a cell search initiated for any appropriate reason.

In 510, the UE 110 selects a carrier frequency band for scanning. This frequency band may be selected on any appropriate basis.

As will be described in more detail below, the UE 110 may store information in an acquisition database that may be used to perform a targeted scan within the selected frequency band. In some embodiments, the contents of the acquisition database may be collected by the UE 110. In other embodiments, the content of the database is provided to the UE 110 by the carrier or a third-party (e.g., the manufacturer of the UE 110). For example, this information may be harvested by the carrier or the third-party from information collected by multiple UEs.

To provide an example, an entry of the acquisition database may include an indication of a particular GSCN associated with a particular cell and/or location. Thus, instead of searching each GSCN relevant to the selected carrier frequency band, the UE 110 may scan a particular frequency corresponding to the GSCN. Specific examples of maintaining the acquisition database will be described below with regard to FIG. 6.

In 515, the UE 110 determines whether any information relevant to scanning the selected frequency band is available in the acquisition database. For example, the UE 110 may query the acquisition database to determine whether an indication of a particular frequency or GSCN on which an SSB is likely to be broadcast is stored in the acquisition database.

If there is relevant information available, the method 500 continues to 520. In 520, the UE 110 scans the selected frequency band using the information stored in the acquisition database. The stored information may indicate that it is likely an SSB will be broadcast at a particular frequency or GSCN. Thus, the UE 110 may tune its transceiver 225 to a frequency associated with the particular GSCN. A specific example of using and maintaining the contents of the acquisition database will be described below with regard to FIG. 6.

Returning to 515, if there is no relevant information available, the method 500 continues to 525. In 525, the UE 110 scans the selected carrier frequency band in accordance with the synchronization raster, e.g., scan one or more GSCNs within the selected frequency band.

In 530, the UE 110 determines whether an SSB is detected during the scan. Detecting the SSB may include detecting the PSS and/or the SSS of the SSB. If the UE 110 does not detect an SSB, the method 500 returns to 510. In some embodiments, the UE 110 may select the same carrier frequency band and perform a further scan of the same carrier frequency band. For example, there may be multiple GSCNs within the carrier frequency band available for scanning. In other embodiments, the UE 110 may select a different carrier frequency band for scanning.

Returning to 530, if the UE 110 detects an SSB, the method 500 continues to 535. In 535, the UE 110 stores an indication of the frequency on which the SSB was broadcast. This indication may be stored locally at the UE 110 in the acquisition database along with further information such as, but not limited to, the corresponding NR-ARFCN and/or GSCN.

In 540, the UE 110 decodes the physical cell ID (PCI) using the PSS and SSS of the SSB. In 545, the UE 110 stores an indication of the PCI along with the information stored in 535. Thus, the acquisition database may include multiple sets of data. One exemplary set of data may include an indication of a frequency band, a GSCN, and/or an NR-ARFCN on which an SSB is likely to be broadcast and a corresponding PCI. At this time, the UE 110 is now camped on the cell that broadcast the SSB. Subsequently, the method 500 ends.

Figure 6:
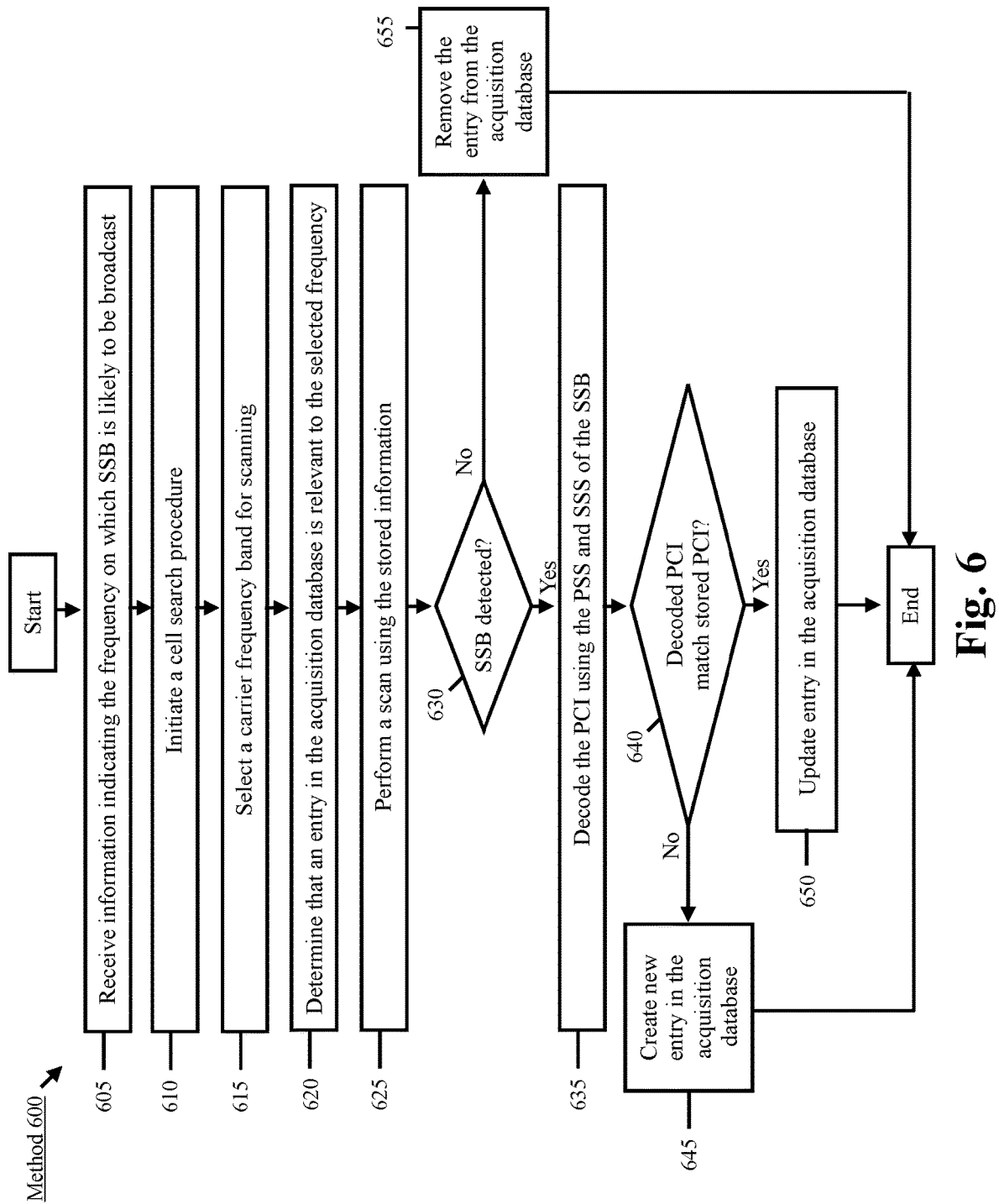
FIG. 6 shows a method for maintaining the acquisition database according to various exemplary embodiments.

FIG. 6 shows a method 600 for maintaining the acquisition database according to various exemplary embodiments. FIG. 6 will be described with regard to the network arrangement 100 of FIG. 1, the UE 110 of FIG. 2 and the method 500 of FIG. 5.

In 605, the UE 110 may receive information indicating the frequency on which SSB is likely to be broadcast. For example, the UE 110 may collect this type of information by performing the method 500 of FIG. 5. In another example, the UE 110 may receive this information type of information in a radio resource control (RRC) message, a message from the carrier, a message from a third-party manufacturer (e.g., the manufacturer of the UE 110) or any other appropriate source.

In 610, the UE 110 initiates a cell search procedure. In 615, the UE 110 selects a carrier frequency band for scanning. 610-615 are substantially similar to 505-510 of the method 500.

In 620, the UE 110 determines that an entry in the acquisition database is relevant to the selected frequency band. For example, the UE 110 may query the acquisition database using the frequency or NR-ARFCN encompassed by the carrier frequency band. The acquisition database may retrieve an indication of a frequency and/or GSCN on which an SSB is likely to be broadcast.

In 625, the UE 110 may perform a scan using the stored information. For example, the UE 110 may tune its transceiver 225 to the frequency associated with the GSCN retrieved by the acquisition database.

In 630, the UE 110 determines whether an SSB has been detected. If an SSB is detected the method 600 continues to 635. In 635, the UE 110 decodes the PCI using the PSS and SSS of the SSB.

At this time, the UE 110 is camped on the cell that broadcast the detected SSB. In 5G NR, due to frequency reuse, it is possible that multiple PCIs use the same NR-ARFCN. Accordingly, in 640, the UE 110 determines whether the decoded PCI is the same PCI included in the entry relevant to the selected frequency band. If the two instances of PCI do not match, the method 600 continues to 645. In 645, the UE 110 may create a new entry in the acquisition database. This new entry may represent a set of information that may include, but is not limited to, the PCI, the scanned frequency and/or GSCN, the selected frequency band and the corresponding NR-ARFCN.

Alternatively, instead of creating an entry for each PCI, the UE 110 may not store or use entries that have similar frequency information but different PCIs. This may avoid ambiguous storage of PCI. In this scenario, the UE 110 may scan for these SSBs in a normal manner.

If the two instances of PCI match, the method 600 continues to 650. In 650, the UE 110 may update the entry in the acquisition database to indicate that the stored information was used successfully. For example, the UE 110 may update the stored information with a timestamp. In some embodiments, this indication may be used to manage the size of the database. For example, if a particular set of stored information has not been used within a predetermined time window, the set of information may be deleted to ensure that the database does not become too large.

Returning to 630, if an SSB is not detected the method 600 continues to 655. In 655, the UE 110 may remove the entry from the acquisition database. Subsequently, the method 600 ends. At this time, the UE 110 is not camped on a cell and may perform a cell search procedure in accordance with the method 500.

As indicated above, the acquisition database may include information collected from any appropriate source. In some embodiments, the contents of an RRC message may be used as a source for the information stored in the acquisition database. For example, while camped on a first cell, the UE 110 may receive an indication of a frequency on which an intra-frequency neighbor cell or an inter-frequency neighbor cell may broadcast an SSB. This indication may be received in an information element (IE) allocated to the UE 110 for measurement purposes. The exemplary embodiments may store this information in the acquisition database so that it may be used as the basis for a scan performed during a subsequent 5G NR cell search. In some scenarios, if the IE for an intra-frequency neighbor cell has "derivceSSB-Index-FromCell" set to true, then the UE 110 may store timing information in the data acquisition database to derive the SSB index during a subsequent cell search. Thus, in some embodiments, the UE 110 may derive which band to scan using information stored in the acquisition database instead of receiving an explicit indication of a frequency or GSCN.

An entry of the acquisition database may also include an indication of the relevant SCS. For example, some 5G NR bands supports multiple types of SCS. To avoid having to perform a scan for each possible SCS, the UE 110 may be able to target a particular SCS using the SCS stored in the acquisition database. Thus, in some embodiments, the UE 110 may target a particular GSCN and/or SCS during a scan for SSB using the information stored in the acquisition database.

It is unlikely for a carrier to change the SCS deployment. Thus, in some embodiments, when performing a scan using the information stored in the acquisition database, the UE 110 may limit the scan to the indicated SCS because it is unlikely that the SCS has changed. However, when performing a scan that is not based on stored information, the UE 110 may scan for all possible SCS configurations.

Some carriers may deploy a 5G NR cell that is co-located with an LTE cell. In some embodiments, the UE 110 may be provided with information that concerns the deployment of co-located cells from the carrier, a third-party or any other appropriate source external to the UE 110 that harvests information from multiple UEs. In one exemplary embodiment, the UE 110 may use this co-located information to forgo scanning co-located frequencies. In another exemplary embodiment, if the frequency deployment is completely co-located and there is a higher coverage frequency band, the UE 110 may reduce or forgo scanning frequencies outside of the higher coverage frequency band. Thus, the UE 110 may perform a scan using, at least in part, co-located information. This example is described with regard to a 5G NR cell and an LTE cell, however, this exemplary technique may also be applicable to an LTE only co-located cell scenario.

In some embodiments, the UE 110 may not prioritize a particular radio access technology (RAT) during scanning. In other embodiments, the UE 110 may prioritize one RAT over another using a weight factor. For example, the UE 110 may assign a first weight factor to a first RAT and a second weight factor to second RAT. The frequency at which the UE 110 scans each RAT may be based on the weight factor. For instance, in the initial years of 5G NR deployment, 5G NR coverage is not as great as LTE coverage. To balance the preference for 5G NR coverage and the likelihood of 5G NR coverage, the UE 110 may assign an (x) weight factor to 5G NR RAT and a (y) weight factor to LTE where y is greater than x. Thus, in this example, the UE 110 may scan more LTE frequencies during the cell search procedure than 5G NR frequencies.

In some scenarios, the 5G NR cell may transmit SSB on multiple beams. During operation, the UE 110 may determine the number of beams on which the 5G NR cell transmits SSB (L) and store it in the acquisition database. The next time the UE 110 wants to camp on the same NR-ARFCN and PCI, the UE 110 can use L to detect SSB. For example, consider a scenario in which L max is set to 4 and represents the maximum number of symbols that may be used for SSB. Those skilled in the art will understand that L max may be defined in the standard. The first time the UE 110 camps on the NR-ARFCN and PCI, the UE 110 determines that L is 2. Thus, the second time the UE 110 camps on the same NR-ARFCN and PCI, the UE 110 may only scan 2 symbols for SSB instead of the maximum number of 4 symbols.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE):
storing multiple entries in a local database, wherein each entry of the multiple entries includes i) one global synchronization channel number (GSCN) from a first set of one or more GSCNs of a synchronization raster identified during one or more cell searches previously performed by the UE and ii) a physical cell ID (PCI);
selecting a first frequency band to scan during a cell search procedure;
determining whether the local database includes at least one entry corresponding to the first frequency band;
when the local database includes at least one entry corresponding the first frequency band, scanning the first frequency band for synchronization signal blocks (SSBs) during the cell search procedure using the local database, wherein scanning the first frequency band using the local database comprises targeting the first set of one or more GSCNs of the synchronization raster that are stored in the local database and omitting a second set of one or more GSCNs of the synchronization raster that are not stored in the local database;

when the local database does not include at least one entry corresponding to the first frequency band, scanning the first frequency band for the SSBs during the cell search procedure using the synchronization raster; and receiving a first SSB from a cell over the first frequency band during the cell search procedure.

2. The method of claim 1, the method further comprising: receiving a radio resource control (RRC) message associated with one of an inter-frequency neighbor cell of the UE or an intra-frequency neighbor cell of the UE.

3. The method of claim 1, wherein the synchronization raster includes a first quantity of GSCNs and a channel raster includes a second quantity of new radio absolute radio frequency channel number (NR-ARFCNs) that is greater than the first quantity.

4. The method of claim 1, wherein each entry further includes a one or more new radio absolute radio frequency channel number (NR-ARFCNs).

5. The method of claim 1, wherein scanning the first frequency band for the SSBs is limited to a single type of subcarrier spacing (SCS) and wherein an indication of the type of SCS is stored the local database.

6. The method of claim 1, wherein the first frequency band includes multiple sub bands.

7. The method of claim 1, further comprising:
when the local database includes at least one entry corresponding the first frequency band, decoding a first PCI from the first SSB using a primary synchronization signal (PSS) and a secondary synchronization signal (SSS) of the first SSB;

determining whether the first PCI matches a second PCI currently stored in the local database with a first entry of the multiple entries;

when the first PCI matches the second PCI, adding a timestamp to the first entry to indicate that the first entry was used successfully during the cell search procedure;

determining, after adding the timestamp, whether the first entry has been used within a predetermined time window based on the timestamp; and when the first entry has not been used within the predetermined time window, deleting the first entry from the local database.

8. The method of claim 7, wherein when the first PCI does not match the second PCI, the UE does not store entries in the local database that have similar frequency information and different PCIs.

9. A user equipment (UE), comprising:
a transceiver configured to communicate with a network; and
a processor configured to perform operations, the operations comprising:
storing multiple entries in a local database, wherein each entry of the multiple entries includes i) one global synchronization channel number (GSCN) from a first set of one or more GSCNs of a synchronization raster identified during one or more cell searches previously performed by the UE and ii) a physical cell ID (PCI);
selecting a first frequency band to scan during a cell search procedure;
determining whether the local database includes at least one entry corresponding to the first frequency band;
when the local database includes at least one entry corresponding the first frequency band, scanning the first frequency band for synchronization signal blocks SSBs during the cell search procedure using the local database, wherein scanning the first frequency band using the local database comprises targeting the first set of one or more GSCNs of the synchronization raster that are stored in the local database and omitting a second set of one or more GSCNs of the synchronization raster that are not stored in the local database;
when the local database does not include at least one entry corresponding to the first frequency band, scanning the first frequency band for the SSBs during the cell search procedure using the synchronization raster; and
receiving a first SSB from a cell over the first frequency band during the cell search procedure.

10. The UE of claim 9, the operations further comprising: receiving a radio resource control (RRC) message associated with one of an inter-frequency neighbor cell of the UE or an intra-frequency neighbor cell of the UE.

11. The UE of claim 9, wherein the synchronization raster includes a first quantity of GSCNs and a channel raster includes a second quantity of new radio absolute radio frequency channel number (NR-ARFCNs) that is greater than the first quantity.

12. The UE of claim 9, wherein scanning the first frequency band for the SSBs is limited to a single type of subcarrier spacing (SCS) and wherein an indication of the type of SCS is stored in the local database.

13. The UE of claim 9, wherein the first frequency hand includes multiple sub bands.

14. A baseband processor configured to perform operations, the operations comprising:
storing multiple entries in a local database, wherein each entry of the multiple entries includes i) one global synchronization channel number (GSCN) from a first set of one or more GSCNs of a synchronization raster identified during one or more cell searches previously performed by the UE and ii) a physical cell ID (PCI);
selecting a first frequency band to scan during a cell search procedure;
determining whether the local database includes at least one entry corresponding to the first frequency band;
when the local database includes at least one entry corresponding the first frequency band, scanning the first frequency band for synchronization signal blocks (SSBs) during the cell search procedure using the local database, wherein scanning the first frequency band using the local database comprises targeting the first set of one or more GSCNs of the synchronization raster that are stored in the local database and omitting a second set of one or more GSCNs based on the local database;
when the local database does not include at least one entry corresponding to the first frequency band, scanning the first frequency band for the SSBs during the cell search procedure using the synchronization raster; and
receiving a first SSB from a cell over the first frequency band during the cell search procedure.

15. The baseband processor of claim 14, the operations further comprising:

receiving a radio resource control (RRC) message associated with one of an inter-frequency neighbor cell of the UE or an intra-frequency neighbor cell of the UE.

16. The baseband processor of claim 14, wherein the synchronization raster includes a first quantity of GSCNs and a channel raster includes a second quantity of new radio absolute radio frequency channel number (NR-ARFCNs) that is greater than the first quantity.

17. The baseband processor of claim 14, wherein scanning the first frequency band for SSBs is limited to a single type of subcarrier spacing (SCS) and wherein an indication of the type of SCS is stored in the local database.

* * * * *